United States Patent
Ueno et al.

(10) Patent No.: US 9,631,949 B2
(45) Date of Patent: Apr. 25, 2017

(54) ROTATION ANGLE DETECTING DEVICE

(71) Applicant: AISIN SEIKI KABUSHIKI KAISHA, Kariya-shi (JP)

(72) Inventors: Shouta Ueno, Toyota (JP); Toshiyuki Matsuo, Takahama (JP); Shinsuke Fushimi, Nishio (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 14 days.

(21) Appl. No.: 14/945,955

(22) Filed: Nov. 19, 2015

(65) Prior Publication Data

US 2016/0146633 A1 May 26, 2016

(30) Foreign Application Priority Data

Nov. 20, 2014 (JP) ................. 2014-235421

(51) Int. Cl.
  *G01B 7/30* (2006.01)
  *B60Q 1/26* (2006.01)
  *G01D 5/14* (2006.01)

(52) U.S. Cl.
  CPC .................. *G01D 5/145* (2013.01)

(58) Field of Classification Search
  CPC ........ G01D 5/145; G01D 5/12; G01D 11/245; G01D 5/20; G01D 5/14; G01D 5/2451; G01D 5/142; G01D 5/147; G01B 21/22; G01B 7/30; G01L 5/221; G01L 3/102; G01L 3/105; G01L 3/101; G01L 3/109; G01L 25/003; G01L 3/10
  USPC .... 324/207.25, 207.22, 207.23, 207.11, 200, 324/245, 167, 259, 173–174, 178–179, 324/161, 162; 702/163, 145, 151, 147; 73/862.331, 862.326, 117.02
  See application file for complete search history.

(56) References Cited

U.S. PATENT DOCUMENTS

| | | | |
|---|---|---|---|
| 7,408,341 B2 | 8/2008 | Okuya et al. | |
| 2005/0012387 A1* | 1/2005 | Suzuki | F04C 2/102 303/116.4 |
| 2007/0108967 A1* | 5/2007 | Okuya | G01D 5/145 324/207.2 |
| 2012/0056617 A1* | 3/2012 | Hirose | B60Q 1/441 324/207.25 |

(Continued)

FOREIGN PATENT DOCUMENTS

| | | |
|---|---|---|
| JP | 2007-093280 | 4/2007 |
| JP | 2007-139458 | 6/2007 |

*Primary Examiner* — Patrick Assouad
*Assistant Examiner* — Taqi Nasir
(74) *Attorney, Agent, or Firm* — Oblon, McClelland, Maier & Neustadt, L.L.P.

(57) ABSTRACT

A rotation angle detecting device includes: a magnet member placed in a shaft member to face a magneto-electric conversion element and detecting a rotation angle of the shaft member in response to a relative rotation of the magnet member with respect to the magneto-electric conversion element, wherein the magnet member has a magnet where a groove formed in a rectangular parallelepiped body having maximum surfaces orthogonal to an axis of the shaft member is formed to be open to one maximum surface side of the rectangular parallelepiped body and extend in parallel to a short-side lateral surface of the rectangular parallelepiped body, and is magnetized along the groove with respect to the magnet.

20 Claims, 7 Drawing Sheets

(56) References Cited

U.S. PATENT DOCUMENTS

| | | | |
|---|---|---|---|
| 2013/0021028 A1* | 1/2013 | Lee | G01D 11/245 |
| | | | 324/251 |
| 2013/0221956 A1* | 8/2013 | Kotani | G01B 7/30 |
| | | | 324/207.25 |
| 2014/0047913 A1* | 2/2014 | Waite | G01M 17/007 |
| | | | 73/117.01 |
| 2014/0197820 A1* | 7/2014 | Ritter | G01D 5/145 |
| | | | 324/207.13 |
| 2014/0197822 A1* | 7/2014 | Ritter | G01D 5/16 |
| | | | 324/207.21 |

* cited by examiner

US 9,631,949 B2

ROTATION ANGLE DETECTING DEVICE

CROSS REFERENCE TO RELATED APPLICATIONS

This application is based on and claims priority under 35 U.S.C. §119 to Japanese Patent Application 2014-235421, filed on Nov. 20, 2014, the entire contents of which are incorporated herein by reference.

TECHNICAL FIELD

This disclosure relates to a rotation angle detecting device and, more particularly, to a rotation angle detecting device that detects a rotation angle of a shaft member in response to a relative rotation of a magnet member with respect to a magneto-electric conversion element.

BACKGROUND DISCUSSION

A non-contact rotation angle detecting device has been known in the prior art. The non-contact rotation angle detecting device detects a rotation angle of a shaft member in order to detect an operation amount of a brake pedal of a car or the like. The non-contact rotation angle detecting device has, for example, a magnet member that is placed in the shaft member to face a magneto-electric conversion element and is configured to detect the rotation angle of the shaft member in response to a relative rotation of the magnet member with respect to the magneto-electric conversion element. As an example, JP 2007-139458A (Reference 1) described below discloses a "rotation angle detecting device that is provided with a housing which is provided with a magnetic sensor, a pivoting member which is provided with a magnet facing the magnetic sensor and is pivotable with respect to the housing, and the shaft member which is operated to pivot with an operated member, and is configured to be capable of detecting an oscillation angle of the operated member based on a change in an output signal from the magnetic sensor which rotates relative to the magnet" (described in Paragraph [0001] of Reference 1).

JP 2007-93280A (Reference 2) described below discloses a "rotation angle sensor that rotates a radially magnetized disk magnet so as to sense a horizontal magnetic field which is generated in the disk magnet with X and Y magneto-electric conversion elements placed at right angles to each other and obtains a rotation angle from output values of the X and Y magneto-electric conversion elements" (described in Paragraph [0016] of Reference 2), in which Hall elements are used as the magneto-electric conversion elements (described in Paragraph [0020]).

In Reference 2 described above, the placement of the magneto-electric conversion elements is specified (described in Paragraph [0016]) for the purpose of "providing the rotation angle sensor that achieves cost reduction and structural simplification with the small magneto-electric conversion elements, allows the magneto-electric conversion element to be placed even at a position spaced apart from the center of the disk magnet, and is capable of suppressing an angular error attributable to a relative positional deviation between the magneto-electric conversion element and the disk magnet" (described in Paragraph [0015] of Reference 2). With regard to its specific configuration, the rotation angle sensor is configured, as disclosed in FIG. 1 and described in Paragraphs [0020] and [0021], to be placed to face the X and Y Hall elements which are magneto-electric conversion elements, rotate the radially magnetized disk magnet so as to sense the subsequent horizontal magnetic field with the X and Y Hall elements placed at right angles to each other, and obtain the rotation angle from their output values.

However, in order to suppress the angular error attributable to the relative positional deviation between the magneto-electric conversion element and the disk magnet, not only the placement of the magneto-electric conversion element but also widening a parallel magnetic field provided for the magneto-electric conversion element to the maximum extent possible is effective. In order to reduce manufacturing costs, it is effective to ensure a magnetic flux density required for operating the Hall IC with a magnet that has a small volume. According to the specific configuration of the rotation angle detecting device described in Reference 1 above, a pair of the Hall ICs are stored in a boss portion that is formed to protrude from a housing main body, a pivoting member that is tiltably linked to a shaft member which is pivotally supported by a cover member has a yoke main body and a magnet holder formed of a non-magnetic body material, and a permanent magnet is stored and supported inside the magnet holder as disclosed in FIG. 2 of Reference 1 and described in Paragraphs [0013] to [0016] of Reference 1 while a relationship between the magneto-electric conversion element and the disk magnet according to Reference 2 differs from that according to Reference 1.

SUMMARY

Thus, a need exists for a rotation angle detecting device which is not suspectable to the drawback mentioned above.

A rotation angle detecting device according to an aspect of this disclosure is configured to include a magnet member placed in a shaft member to face a magneto-electric conversion element and detect a rotation angle of the shaft member in response to a relative rotation of the magnet member with respect to the magneto-electric conversion element, in which the magnet member has a magnet where a groove formed in a rectangular parallelepiped body having maximum surfaces orthogonal to an axis of the shaft member is formed to be open to one maximum surface side of the rectangular parallelepiped body and extend in parallel to a short-side lateral surface of the rectangular parallelepiped body, and is magnetized along the groove with respect to the magnet.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
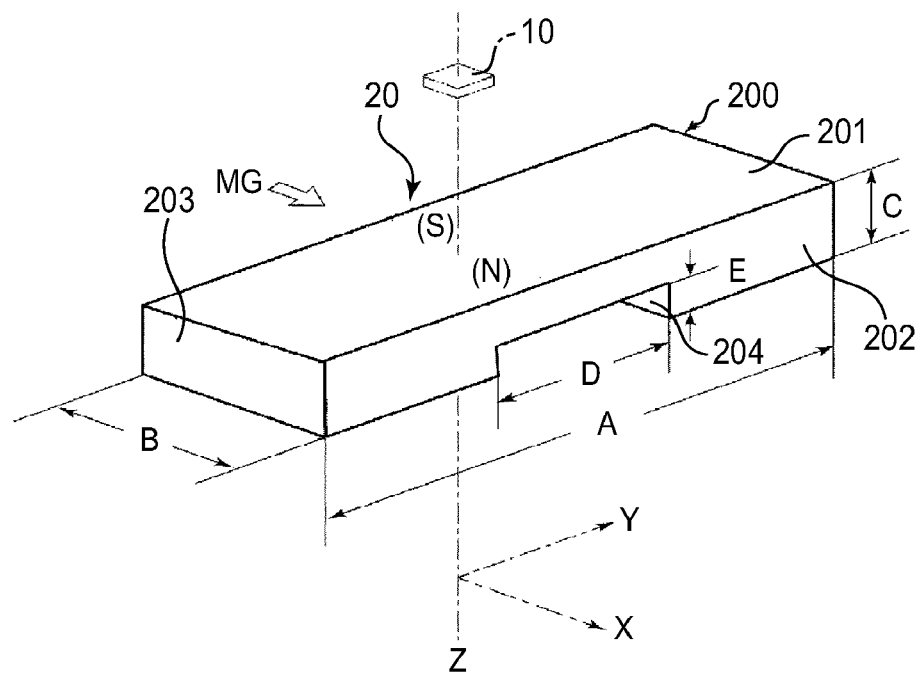
FIG. 1 is a perspective view of a magnet member provided for an embodiment disclosed here.
Figure 2:
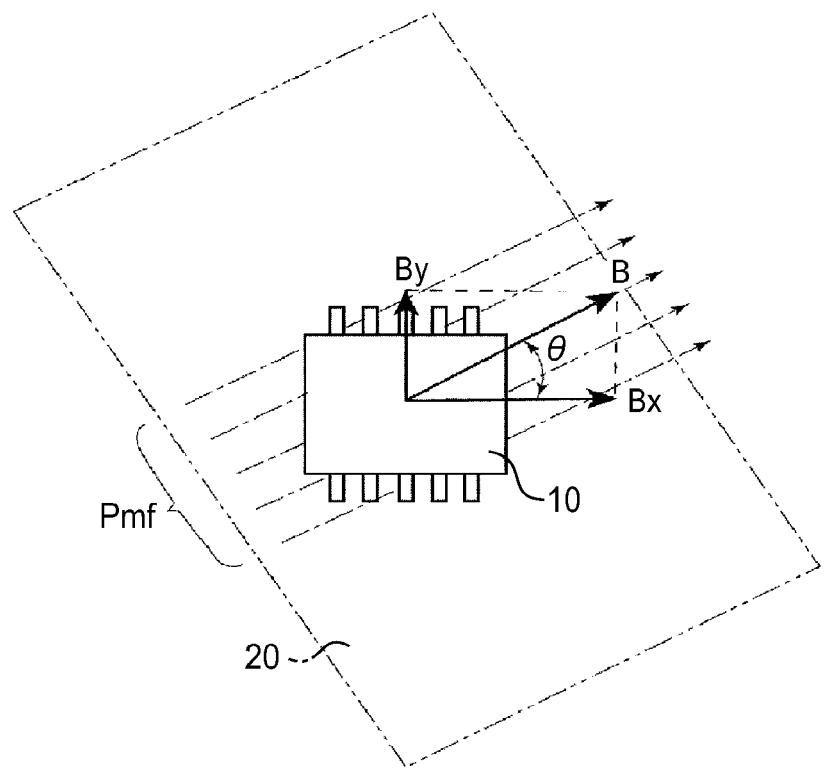
FIG. 2 is a plan view illustrating a relationship between the magnet member and a magneto-electric conversion element provided for the embodiment disclosed here.
Figure 3:
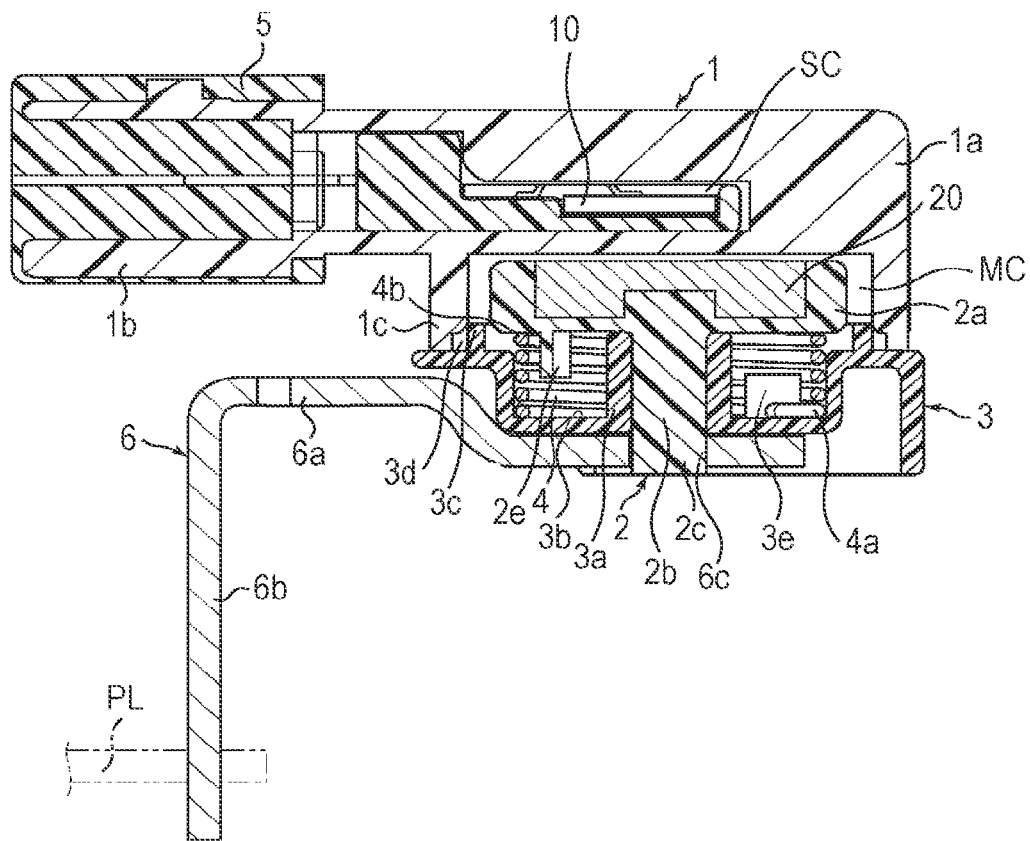
FIG. 3 is a cross-sectional view of a rotation angle detecting device according to the embodiment disclosed here.

Hereinafter, a preferred embodiment disclosed here will be described with reference to accompanying drawings. FIGS. 1 to 9 relate to the embodiment disclosed here. FIG. 1 is an enlarged view of a magnet member 20 that is used in a non-contact rotation angle detecting device which detects a rotation angle of a shaft member 2 in response to a relative rotation of the magnet member 20 with respect to a magneto-electric conversion element 10 as illustrated in FIG. 3. As illustrated in FIG. 1, the magnet member 20 has a magnet 200 where a groove 204 is formed and is magnetized along the groove 204 with respect to the magnet 200. With respect to a rectangular parallelepiped body that is configured to have maximum surfaces (shown as 201 on behalf of two parallel surfaces), long-side lateral surfaces (shown as 202 on behalf of two parallel surfaces), and short-side lateral surfaces (shown as 203 on behalf of two parallel surfaces), the groove 204 is open to one maximum surface 201 side and extends in parallel to the short-side lateral surfaces 203. In FIG. 1, a white arrow MG shows the magnetization direction and (N) and (S) show magnetic poles after the magnetization.

In this embodiment, the length (B) of the side of the magnet 200 on the short side is set to one-third of the length (A) of the side of the magnet 200 on the long side. The groove 204 of the magnet 200 has a rectangular cross-sectional shape and is formed such that the long-side center of the groove 204 extends in parallel to the short-side lateral surfaces 203 while including the center of the long-side lateral surfaces 202. The width (D) of the groove 204 is set to one-third of the length (A) of the side of the magnet 200 on the long side, and the depth (E) of the groove 204 is set to one half of the thickness (C) of the magnet 200. As illustrated in FIG. 1, the groove 204 is formed to be open to the maximum surface 201 side (lower side in FIG. 1) of the magnet 200, which is the side opposite to the side that is placed to face the magneto-electric conversion element 10. As described later, the above-described dimensional relationships are set based on simulation results, are not limited to precise values, include approximate values, and may be approximately one half, approximately one-third, and the like. Nevertheless, it has been confirmed as described later that the width (D) of the groove 204 can be subjected to use when set to four-fifteenths to eight-fifteenths of the length (A) of the side of the magnet 200 on the long side, and thus the width (D) of the groove 204 is set, within this range, to one-third of the length (A) of the side of the magnet 200 on the long side as described above.

A parallel magnetic field is formed in the vicinity of the magneto-electric conversion element 10 by the magnet member 20. When the magnet member 20 is driven to rotate about an axis (Z in FIG. 1) of the shaft member 2, the parallel magnetic field that is formed by the magnet member 20 rotates relative to the magneto-electric conversion element 10 which has a fixed position (illustrated in FIG. 3) as indicated by the arrows of one-dot chain line in FIG. 2, and an X-direction component Bx and a Y-direction component By of a magnetic field strength B at a rotation angle of, for example, θ are detected by the magneto-electric conversion element 10. Then, a signal that is proportional to the magnetic field direction is output from the magneto-electric conversion element 10, and the rotation angle θ is calculated. In a case where the position of the magneto-electric conversion element 10 is moved to the outside of a region of the parallel magnetic field (Pmf in FIG. 2) due to backlash or the like, an error definitely ensues, and thus it is desirable that the region of the parallel magnetic field provided for the magneto-electric conversion element 10 is as wide as possible. Securing the region of the parallel magnetic field regarding this embodiment will be described later based on the simulation results that are illustrated in FIGS. 10A to 12.

FIGS. 3 to 9 show the rotation angle detecting device that is provided with the magnet member 20. The rotation angle detecting device serves to detect an operation amount of an external mechanism such as a brake pedal. The magneto-electric conversion element 10 is configured to have, for example, a pair of Hall ICs. A supporting member 3 that rotatably supports the shaft member 2 is bonded to a housing 1 that accommodates the magneto-electric conversion element 10. One end of a coil spring that constitutes a return spring 4 is locked to the shaft member 2, and the other end of the coil spring is locked to the supporting member 3. When a connector member 5 such as a waterproof connector is bonded to the housing 1, the magneto-electric conversion element 10 is electrically connected to the connector member 5 and the magneto-electric conversion element 10 is sealed against the outside. Then, a driving lever 6 is fixed to the shaft member 2 and is placed to be engaged with a pedal lever PL to constitute a brake pedal sensor. Hereinafter, each constituting member will be described in detail.

Figure 4:
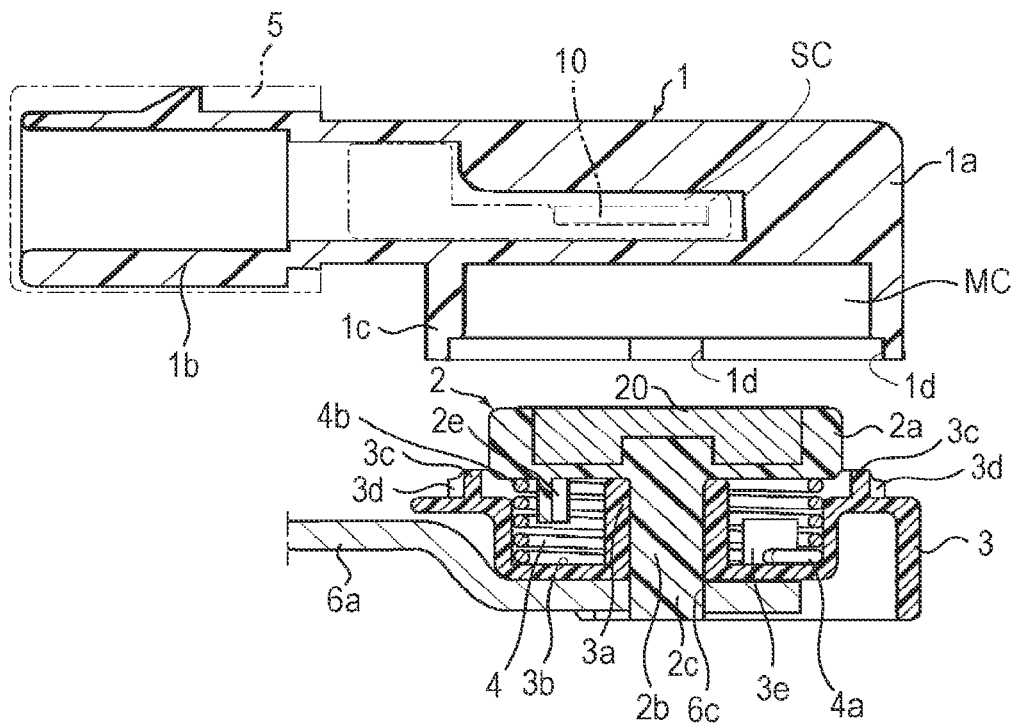
FIG. 4 is a cross-sectional view separately illustrating a housing and a supporting member provided for the embodiment disclosed here.

The housing 1 is formed of a synthetic resin. As illustrated in FIGS. 3 and 4, the housing 1 has a main body portion 1*a* and a joint 1*b*. An element chamber SC is formed in the main body portion 1*a*. At least the magneto-electric conversion element 10 is accommodated in the main body portion 1*a*. In addition, a magnet chamber MC is formed separately from the element chamber SC in the main body portion 1*a*. The main body portion 1*a* is bonded to the supporting member 3, which is formed of a synthetic resin, such that the magnet member 20 is accommodated at a position in the magnet chamber MC which faces the magneto-electric conversion element 10. The joint 1*b* is integrally formed with the main body portion 1*a*, and the joint 1*b* is configured such that the element chamber SC communicates with an external space only via the joint 1*b*. Accordingly, when the connector member 5 is fitted into the joint 1*b* in a liquid-tight manner, the element chamber SC becomes a sealed space. The housing 1 according to this embodiment has a cylindrical portion 1c that integrally extends from the main body portion 1a. When laser welding is performed over the entire circumference of the cylindrical portion 1c, for example, the cylindrical portion 1c is bonded to the supporting member 3 in close contact with the supporting member 3 and the magnet chamber MC is shielded from the external space.

Figure 5:
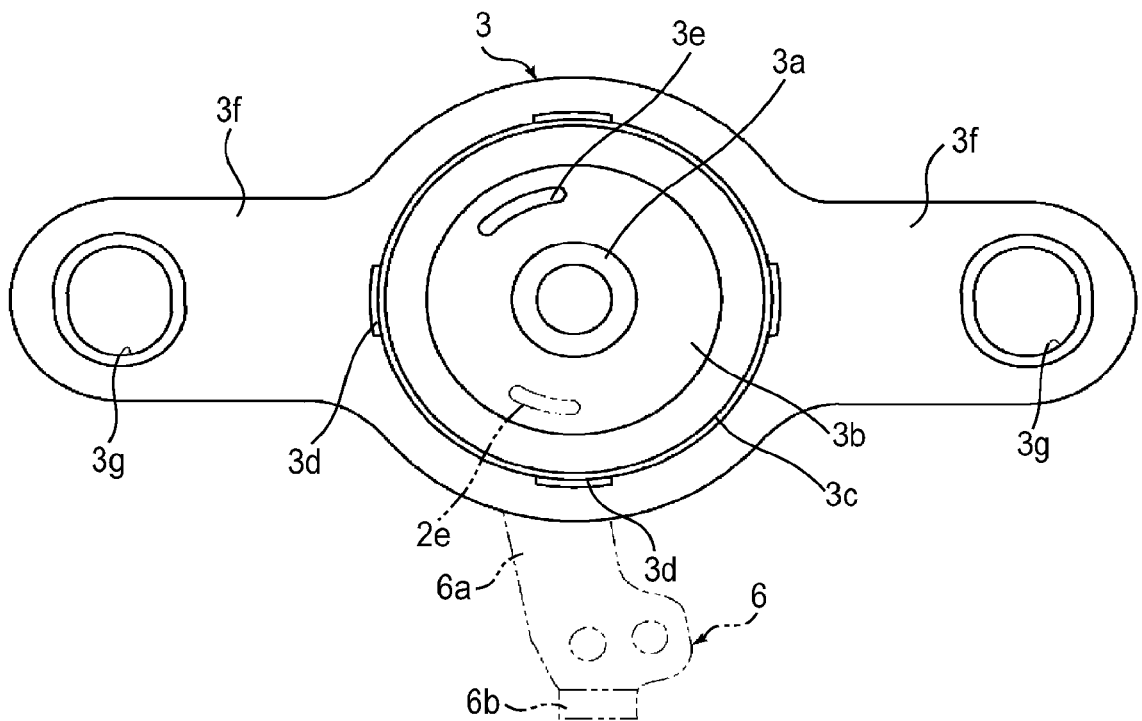
FIG. 5 is a plan view illustrating the supporting member provided for the embodiment disclosed here.
Figure 6:
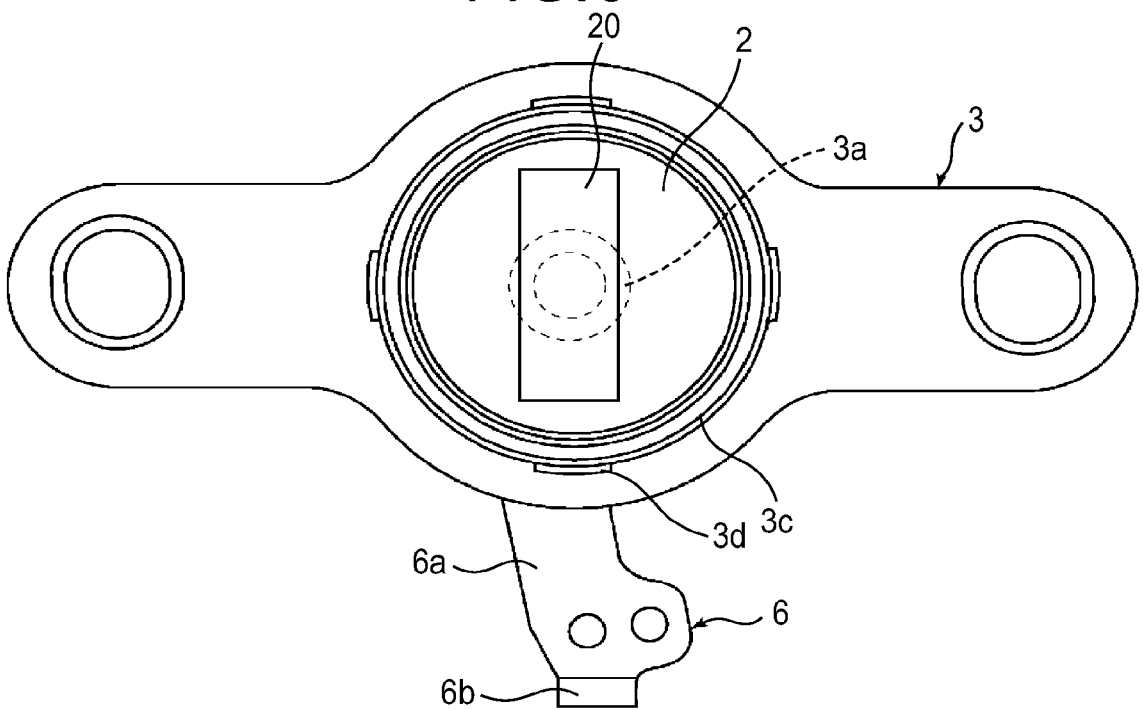
FIG. 6 is a plan view illustrating a state where a shaft member is mounted on the supporting member provided for the embodiment disclosed here.

As illustrated in FIGS. 5 and 6, a bearing portion 3a that rotatably supports the shaft member 2 is formed in the supporting member 3 and an annular recessed portion 3b is formed around the bearing portion 3a. An annular vertical wall 3c is formed around the annular recessed portion 3b. The vertical wall 3c is configured to be fitted into an inner peripheral surface of the cylindrical portion 1c of the housing 1. A plurality of (four in this embodiment) projections 3d are formed to extend from the vertical wall 3c for positioning during the fitting of the vertical wall 3c into the cylindrical portion 1c. Recessed portions 1d that are fitted into the projections 3d are formed in the inner peripheral surface of the cylindrical portion 1c. A locking projection 3e, which has an arc shape in plan view, is formed to extend in the annular recessed portion 3b so as to lock an end portion 4a of the return spring 4. A pair of flanged portions 3f and 3f are formed outside the vertical wall 3c to extend in directions away from each other. Mounting holes 3g and 3g are formed in the respective flanged portions 3f and 3f.

Figure 7:
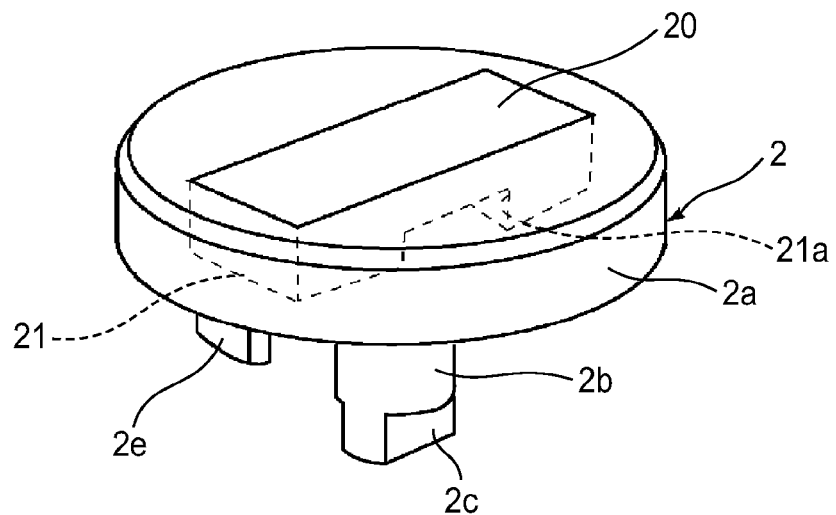
FIG. 7 is a perspective view illustrating the shaft member provided for the embodiment disclosed here.
Figure 8:
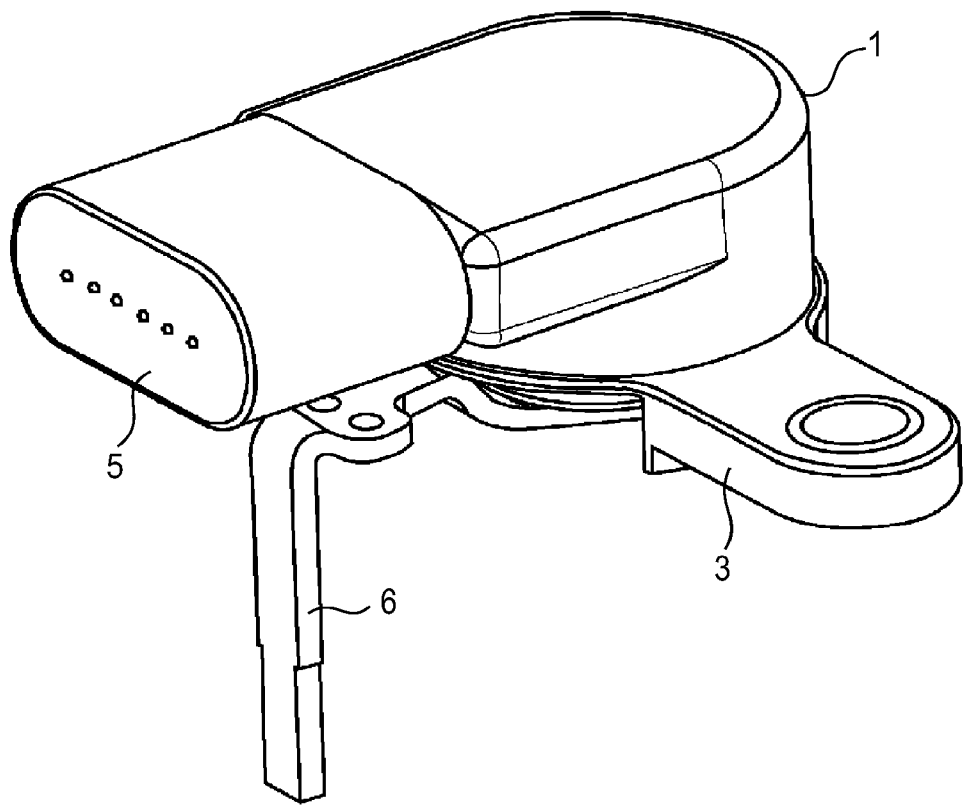
FIG. 8 is a perspective view illustrating the rotation angle detecting device according to the embodiment disclosed here.

As illustrated in FIG. 7, the shaft member 2 has a disk portion 2a and a shaft portion 2b integrally formed with each other by a synthetic resin, and the magnet member 20 that is illustrated in FIG. 1 is embedded in the disk portion 2a. An engaging portion 2c that has a so-called dihedral width is formed at a tip of the shaft portion 2b and is configured to be engageable with an engaging hole 6c (refer to FIG. 9) which is formed in the driving lever 6 and has a dihedral width. An arc-shaped locking projection 2e is formed to extend from a lower surface of the disk portion 2a of the shaft member 2 so as to lock an end portion 4b of the return spring 4. The locking projection 2e has the plan-view positional relationship that is illustrated in FIG. 5 with respect to the locking projection 3e of the supporting member 3.

The driving lever 6 has an extending portion 6a that extends in a radial direction of the shaft member 2 and an engaging portion 6b that extends in parallel to the axis of the shaft member 2 and is engaged with the external mechanism (pedal lever PL). The driving lever 6 is configured to drive the shaft member 2 to rotate against a biasing force of the return spring 4 with one end of the extending portion 6a fixed to the shaft member 2 and the other end of the extending portion 6a extending in the radial direction of the shaft member 2 (as a result of the engagement between the engaging hole 6c and the engaging portion 2c). The magnet member 20 has the above-described configuration (FIG. 1), the magneto-electric conversion element 10 has the pair of Hall ICs (not illustrated), a change in the angle of the parallel magnetic field that depends on the rotation of the shaft member 2, a change in the rotation angle of the magnet member 20 eventually, is detected by the pair of Hall ICs, and a voltage output in accordance with the magnetic field angle is supplied to external equipment (not illustrated) via the connector member 5.

Figure 9:
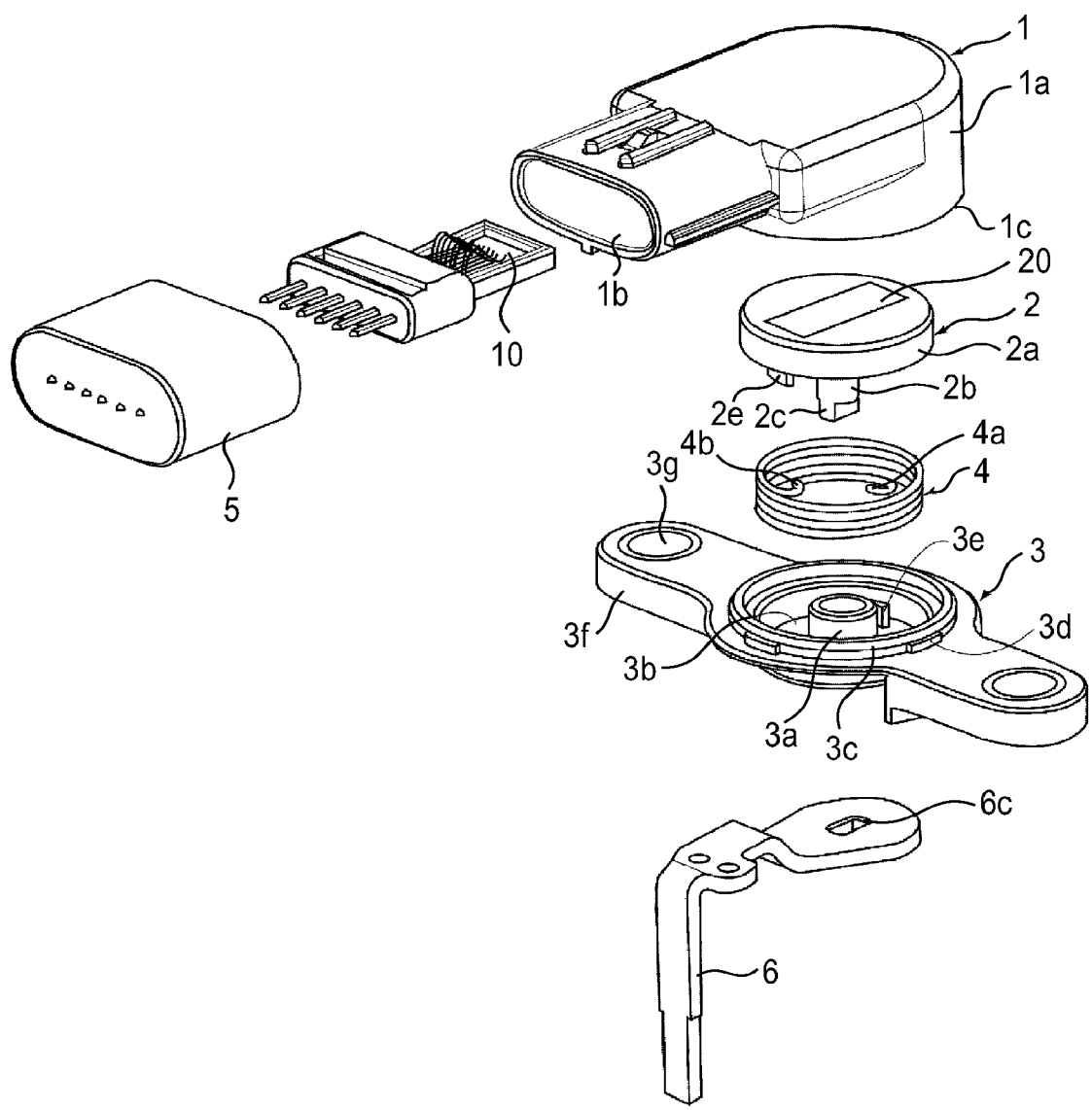
FIG. 9 is an exploded perspective view illustrating the rotation angle detecting device according to the embodiment disclosed here.

An assembly process for the rotation angle detecting device will be described with reference to FIG. 9. Firstly, the return spring 4 is accommodated in the annular recessed portion 3b of the supporting member 3 and the end portion 4a of the return spring 4 is locked to the locking projection 3e. Then, the state that is illustrated in the lower section of FIG. 4 is achieved when the disk portion 2a of the shaft member 2 is accommodated in the annular vertical wall 3c with the shaft portion 2b of the shaft member 2 accommodated in the bearing portion 3a of the supporting member 3 and the end portion 4b of the return spring 4 locked to the locking projection 2e of the shaft member 2. In this state, the housing 1 that is illustrated in the upper section of FIG. 4 is bonded to the supporting member 3. In other words, the recessed portions 1d that are formed in the cylindrical portion 1c of the housing 1 are fitted into the respective projections 3d that are formed on the vertical wall 3c of the supporting member 3, and the cylindrical portion 1c is fitted into the vertical wall 3c at a predetermined position. Then, laser welding is performed over the entire circumference of the cylindrical portion 1c. In this manner, the housing 1 is bonded to the supporting member 3 in close contact with the supporting member 3, and the magnet chamber MC that is illustrated in FIG. 3 is formed.

Then, the magneto-electric conversion element 10 is accommodated in the main body portion 1a of the housing 1 for holding at a position facing the magneto-electric conversion element 10, the connector member 5 is electrically connected to the pair of Hall ICs (not illustrated) constituting the magneto-electric conversion element 10 in the main body portion 1a, the connector member 5 is fitted into the joint 1b in a liquid-tight manner, and the element chamber SC that is the sealed space is formed as illustrated in FIG. 3. In addition, the engaging hole 6c of the driving lever 6 is engaged with and bonded to the engaging portion 2c of the shaft member 2, and the shaft member 2 is driven to rotate in response to an oscillation of the driving lever 6.

As illustrated in FIG. 3, the rotation angle detecting device that has the above-described configuration is placed such that the engaging portion 6b of the driving lever 6 is engaged with the pedal lever PL. In this case, the driving lever 6 is in a state of being pressed to the pedal lever PL by the biasing force of the return spring 4, and thus the pedal lever PL is held at an initial position that is set in advance. When the pedal lever PL is operated in this state, the driving lever 6 oscillates about the axis of the shaft member 2 (shaft portion 2b) and the shaft member 2 is driven to rotate against the biasing force of the return spring 4. Accordingly, the magnet member 20 that is embedded in the disk portion 2a of the shaft member 2 rotates about the axis of the shaft portion 2b. In other words, the magnet member 20 that is supported by the supporting member 3 (which is integral with the housing 1) rotates relative to the magneto-electric conversion element 10 accommodated and supported in the housing 1, and the change in the angle of the parallel magnetic field that depends on the change in the rotation angle of the magnet member 20 is detected by the pair of Hall ICs in the magneto-electric conversion element 10. Then, the voltage output in accordance with the magnetic field angle is supplied to the external equipment (not illustrated) via the connector member 5.

Figure 10A:
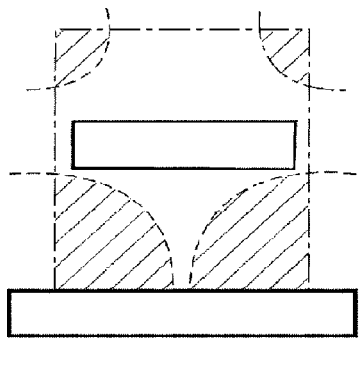
FIGS. 10A and 10B are distribution diagrams illustrating a comparison between parallel magnetic field region simulation results of the magnet member provided for the embodiment disclosed here and a magnet member of the prior art.
Figure 10B:
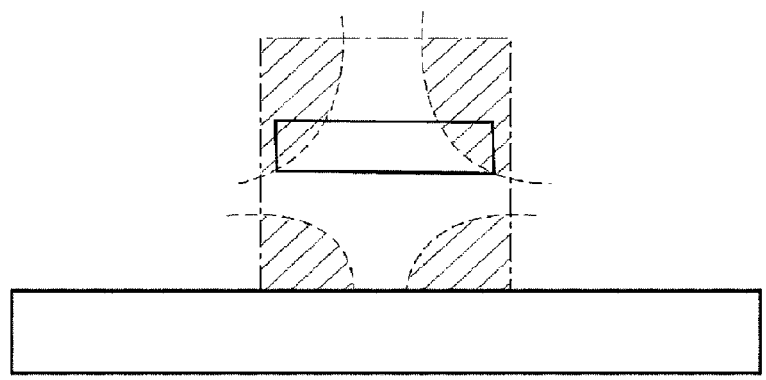

The magnet 200 that constitutes the magnet member 20 which is used in the rotation angle detecting device described above is formed as illustrated in FIG. 1 so that a parallel magnetic field detection region provided for the magneto-electric conversion element 10 is secured. Because the part where the groove 204 is formed in particular is thinner (smaller in volume) than the other parts and magnetic force lines concentrate in the vicinity of the groove 204, the region of the parallel magnetic field becomes wider at this part and a small and stable parallel magnetic field detection region is ensured. The following description will be based on the results of simulations performed on this embodiment and a magnet of the prior art, which are illustrated in FIGS. 10A and 10B. The white section (non-hatched region) in FIG. 10A shows the region of the parallel magnetic field on an X-Z plane formed by the magnet member 20 of this embodiment (that is, a region parallel to the magnetization direction), and the white section (non-hatched region) in FIG. 10B shows the region of the parallel magnetic field on the X-Z plane formed by a disk magnet according to, for example, Reference 2.

In both FIGS. 10A and 10B, the rectangular solid-line region is the detection region. In FIG. 10A, however, the hatched region (that is not the parallel magnetic field) is not included, and thus it can be appreciated that the parallel magnetic field detection region is ensured with stability without being affected by an X-direction deviation. When it comes to the Y direction, both are the same as each other, and thus description thereof will be omitted. A comparison between volumes of the magnets allowing a predetermined magnetic flux density at a point where the distances from the magnets are equal to each other shows that the volume of the magnet 200 according to this embodiment is one half or less of that of the disk magnet, and thus requires less magnet material and less manufacturing costs than the disk magnet.

Figure 11A:
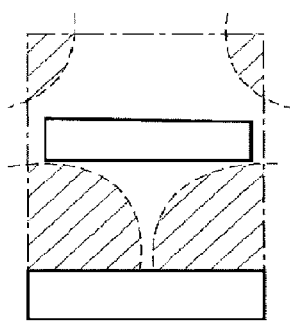
FIGS. 11A and 11B are distribution diagrams illustrating a comparison between parallel magnetic field region simulation results of the magnet member provided for the embodiment disclosed here and a comparative example.
Figure 11B:
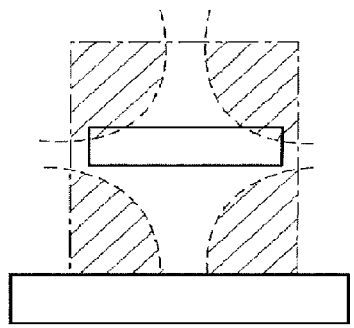

Results of simulations performed while the shape of the magnet 200 according to this embodiment is determined will be described below. The white sections (non-hatched regions) in FIGS. 11A and 11B show the region of the parallel magnetic field on the X-Z plane after the magnetization, FIG. 11A pertaining to a case where the length (B) of the side of the magnet 200 on the short side is set to one-third of the length (A) of the side of the magnet 200 on the long side and FIG. 11B pertaining to a case where the length (B) of the side of the magnet 200 on the short side is set to one half of the length (A) of the side of the magnet 200 on the long side, respectively. In FIGS. 11A and 11B, the rectangular solid-line region is the detection region. That in FIG. 11A is less likely to be affected by the X-direction deviation, and thus it is confirmed that the parallel magnetic field detection region is ensured with stability in this case.

Figure 12:
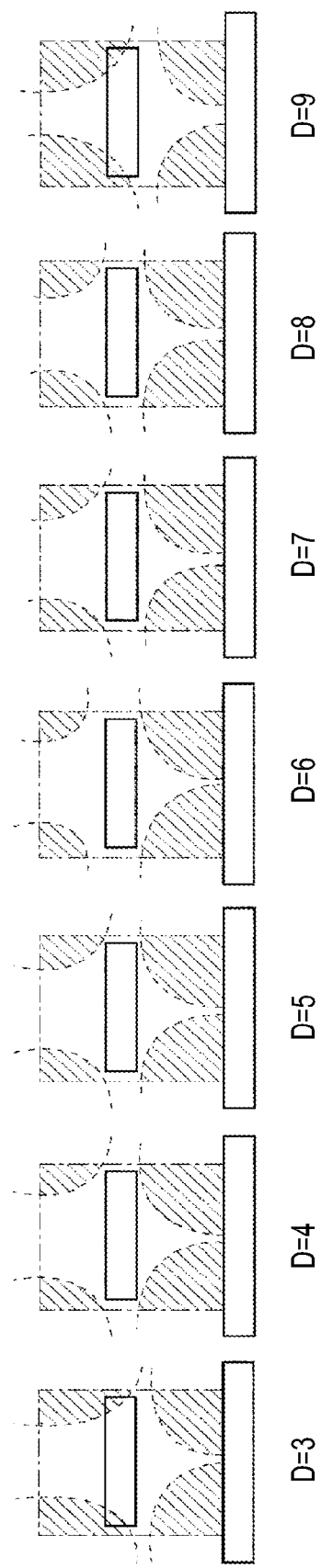
FIG. 12 is a distribution diagram illustrating a comparison between the parallel magnetic field region simulation results of the magnet member provided for the embodiment disclosed here and the comparative example.

FIG. 12 shows results of simulations in which the width (D) of the groove 204 is set millimeter by millimeter within a range of 3 mm to 9 mm in a state where the length (A) of the side of the magnet 200 on the long side is fixed at 15 mm with regard to the setting of the width (D in FIG. 1) of the groove 204 with respect to the length (A in FIG. 1) of the side of the magnet 200 on the long side described above. In this drawing, the white sections (non-hatched regions) show the regions of the parallel magnetic field on the X-Z plane after the magnetization with respect to the respective ones of D from 3 to 9, and the rectangular solid-line region is the detection region. It is confirmed from the results that the parallel magnetic field can be ensured within the range of use in a case where D is 4 to 8 and it is not ensured within the range of use in a case where D is 3 or 9 as illustrated in FIG. 12. Accordingly, the width (D) of the groove 204 of the magnet 200 may be set to four-fifteenths to eight-fifteenths of the length (A) of the side of the magnet 200 on the long side, and the width (D) of the groove 204 is set, within this range, to one-third of the length (A) of the side of the magnet 200 on the long side in this embodiment.

A rotation angle detecting device according to an aspect of this disclosure is configured to include a magnet member placed in a shaft member to face a magneto-electric conversion element and detect a rotation angle of the shaft member in response to a relative rotation of the magnet member with respect to the magneto-electric conversion element, in which the magnet member has a magnet where a groove formed in a rectangular parallelepiped body having maximum surfaces orthogonal to an axis of the shaft member is formed to be open to one maximum surface side of the rectangular parallelepiped body and extend in parallel to a short-side lateral surface of the rectangular parallelepiped body, and is magnetized along the groove with respect to the magnet.

In the above-described rotation angle detecting device, it is preferable that the groove of the magnet has a rectangular cross-sectional shape and is formed such that a long-side center of the rectangular cross-sectional shape extends in parallel to the short-side lateral surface of the rectangular parallelepiped body while including a center of a long-side lateral surface of the rectangular parallelepiped body. In addition, it is preferable that a width of the groove of the magnet is set to four-fifteenths to eight-fifteenths of a length of a side of the rectangular parallelepiped body on the long side. In addition, it is preferable that a depth of the groove of the magnet is set to one half of a thickness of the rectangular parallelepiped body.

In addition, in the above-described rotation angle detecting device, it is preferable that the groove of the magnet is formed to be open to the maximum surface side of the magnet on a side opposite to a side placed to face the magneto-electric conversion element.

In addition, it is preferable that a length of a side of the magnet on a short side of the rectangular parallelepiped body is set to one-third of the length of the side of the magnet on the long side of the rectangular parallelepiped body. In addition, it is preferable that the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

The aspect of this disclosure achieves the following effects based on the above-described configuration. In the rotation angle detecting device according to this disclosure, the magnet member is configured to have the magnet where the groove formed in the rectangular parallelepiped body having the maximum surfaces orthogonal to the axis of the shaft member is formed to be open to the one maximum surface side of the rectangular parallelepiped body and extend in parallel to the short-side lateral surface of the rectangular parallelepiped body, and be magnetized along the groove with respect to the magnet. Accordingly, the region of the parallel magnetic field provided for the magneto-electric conversion element can be widened by the small magnet member.

In the above-described rotation angle detecting device, the region of the parallel magnetic field can be further widened insofar as the groove of the magnet has the rectangular cross-sectional shape and is formed such that the long-side center of the rectangular cross-sectional shape extends in parallel to the short-side lateral surface of the rectangular parallelepiped body while including the center of the long-side lateral surface of the rectangular parallelepiped body. In particular, the region of the parallel magnetic field can be ensured with stability insofar as the width of the groove of the magnet is set to four-fifteenths to eight-fifteenths of the length of the side of the rectangular parallelepiped body on the long side or the depth of the groove of the magnet is set to one half of the thickness of the rectangular parallelepiped body.

In the above-described rotation angle detecting device, the region of the parallel magnetic field can be ensured with stability insofar as the groove of the magnet is formed to be open to the maximum surface side of the magnet on the side opposite to the side placed to face the magneto-electric conversion element. In addition, the region of the parallel magnetic field can be widened insofar as the length of the side of the magnet on the short side of the rectangular parallelepiped body is set to one-third of the length of the side of the magnet on the long side of the rectangular parallelepiped body. In addition, the magnet member can be appropriately placed with respect to the magneto-electric conversion element insofar as the shaft member has the disk portion and the shaft portion integrally formed with each other, the disk portion being embedded such that the surface of the magnet member on the side facing the magneto-electric conversion element is exposed to the surface and the shaft portion vertically extending from the center of the disk portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotation angle detecting device comprising:
   a magnet member placed in a shaft member to face a magneto-electric conversion element and detecting a rotation angle of the shaft member in response to a relative rotation of the magnet member with respect to the magneto-electric conversion element,
   wherein the magnet member has a magnet where a groove formed in a rectangular parallelepiped body having maximum surfaces orthogonal to an axis of the shaft member is formed to be open to one maximum surface side of the rectangular parallelepiped body and extend in parallel to a short-side lateral surface of the rectangular parallelepiped body, and is magnetized along the groove with respect to the magnet.

2. The rotation angle detecting device according to claim 1,
   wherein the groove of the magnet has a rectangular cross-sectional shape and is formed such that a long-side center of the rectangular cross-sectional shape extends in parallel to the short-side lateral surface of the rectangular parallelepiped body while including a center of a long-side lateral surface of the rectangular parallelepiped body.

3. The rotation angle detecting device according to claim 2,
   wherein a width of the groove of the magnet is set to four-fifteenths to eight-fifteenths of a length of a side of the rectangular parallelepiped body on the long side.

4. The rotation angle detecting device according to claim 2,
   wherein a depth of the groove of the magnet is set to one half of a thickness of the rectangular parallelepiped body.

5. The rotation angle detecting device according to claim 3,
   wherein a depth of the groove of the magnet is set to one half of a thickness of the rectangular parallelepiped body.

6. The rotation angle detecting device according to claim 1,
   wherein the groove of the magnet is formed to be open to the maximum surface side of the magnet on a side opposite to a side placed to face the magneto-electric conversion element.

7. The rotation angle detecting device according to claim 2,
   wherein the groove of the magnet is formed to be open to the maximum surface side of the magnet on a side opposite to a side placed to face the magneto-electric conversion element.

8. The rotation angle detecting device according to claim 3,
   wherein the groove of the magnet is formed to be open to the maximum surface side of the magnet on a side opposite to a side placed to face the magneto-electric conversion element.

9. The rotation angle detecting device according to claim 4,
   wherein the groove of the magnet is formed to be open to the maximum surface side of the magnet on a side opposite to a side placed to face the magneto-electric conversion element.

10. The rotation angle detecting device according to claim 1,
    wherein a length of a side of the magnet on a short side of the rectangular parallelepiped body is set to one-third of the length of the side of the magnet on the long side of the rectangular parallelepiped body.

11. The rotation angle detecting device according to claim 2,
    wherein a length of a side of the magnet on a short side of the rectangular parallelepiped body is set to one-third of the length of the side of the magnet on the long side of the rectangular parallelepiped body.

12. The rotation angle detecting device according to claim 3,
    wherein a length of a side of the magnet on a short side of the rectangular parallelepiped body is set to one-third of the length of the side of the magnet on the long side of the rectangular parallelepiped body.

13. The rotation angle detecting device according to claim 4,
    wherein a length of a side of the magnet on a short side of the rectangular parallelepiped body is set to one-third of the length of the side of the magnet on the long side of the rectangular parallelepiped body.

14. The rotation angle detecting device according to claim 6,
    wherein a length of a side of the magnet on a short side of the rectangular parallelepiped body is set to one-third of the length of the side of the magnet on the long side of the rectangular parallelepiped body.

15. The rotation angle detecting device according to claim 1,
    wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

16. The rotation angle detecting device according to claim 2,
wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

17. The rotation angle detecting device according to claim 3,
wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

18. The rotation angle detecting device according to claim 4,
wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

19. The rotation angle detecting device according to claim 6,
wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

20. The rotation angle detecting device according to claim 10,
wherein the shaft member has a disk portion and a shaft portion integrally formed with each other, the disk portion being embedded such that a surface of the magnet member on a side facing the magneto-electric conversion element is exposed to a surface and the shaft portion vertically extending from a center of the disk portion.

* * * * *